No. 884,371. PATENTED APR. 14, 1908.
S. R. DRESSER.
PIPE COUPLING.
APPLICATION FILED JULY 9, 1906.
2 SHEETS—SHEET 1.
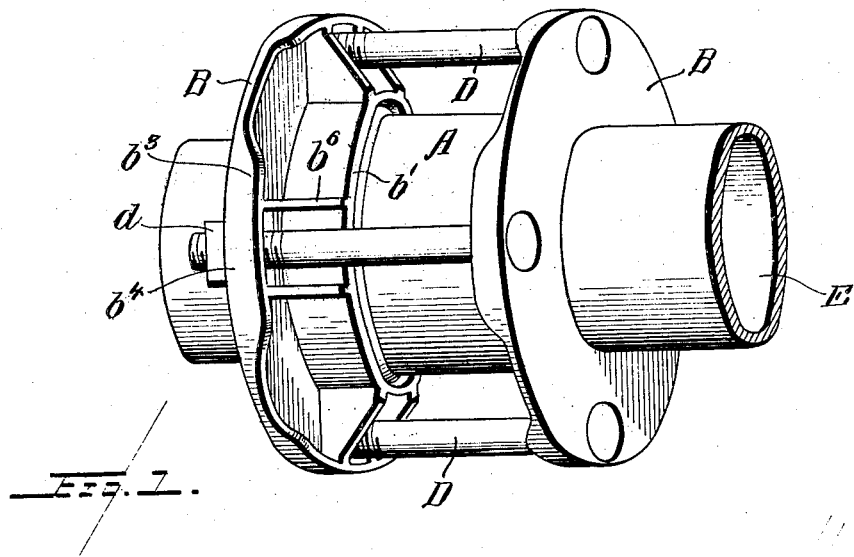
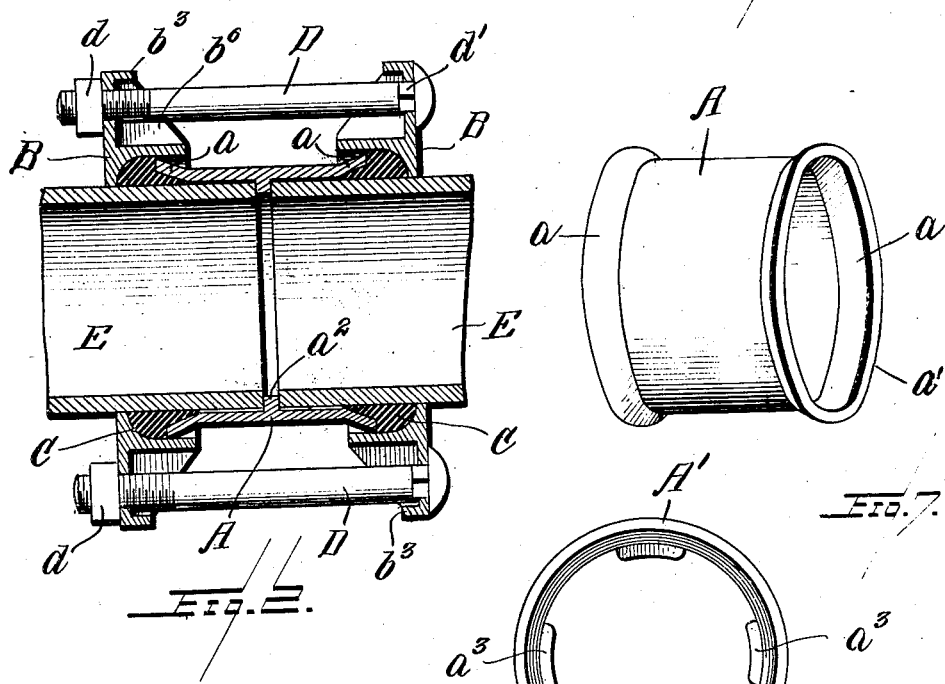
WITNESSES:
INVENTOR
Solomon R. Dresser
BY Whitaker Prevost Attorneys.

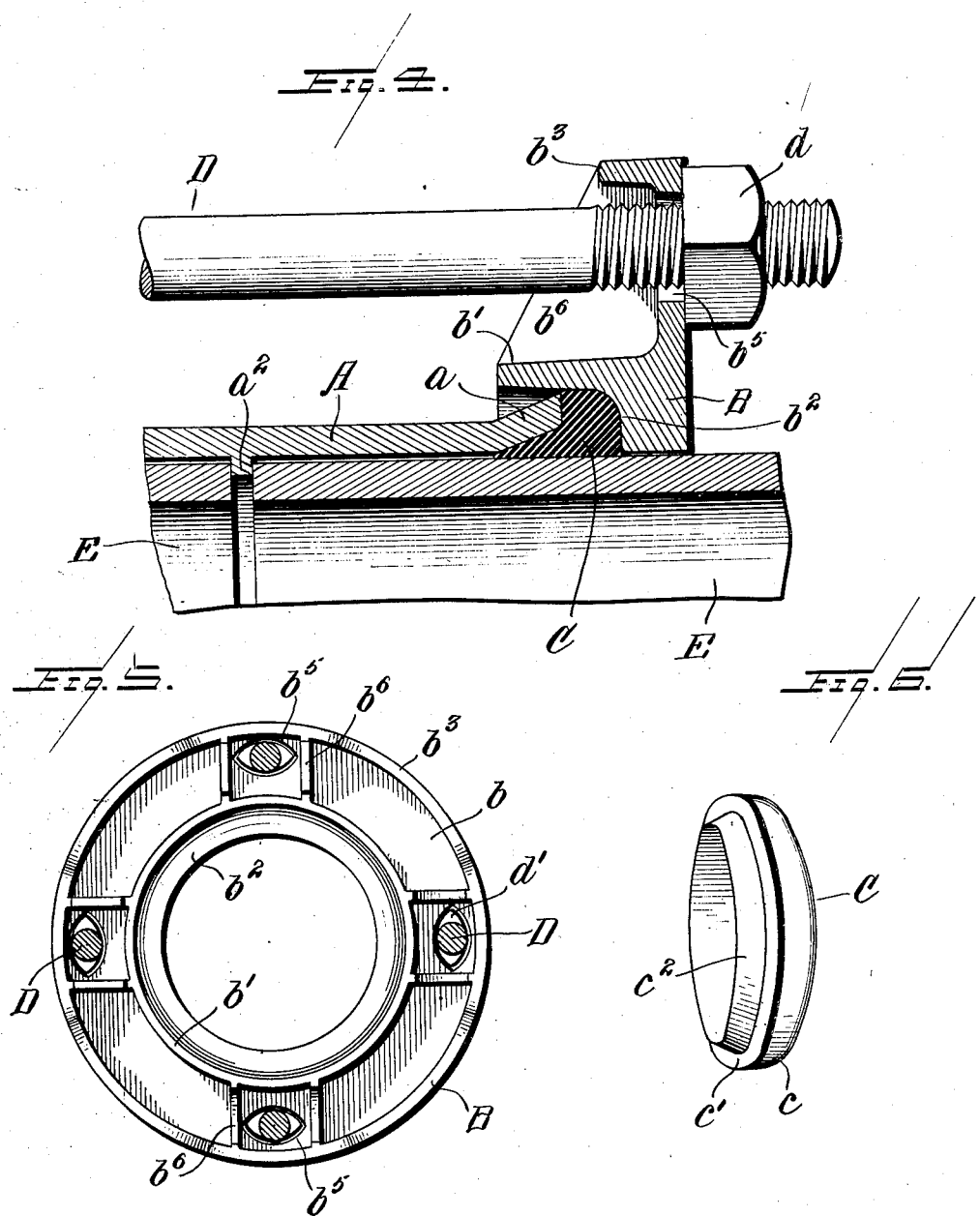

UNITED STATES PATENT OFFICE.

SOLOMON R. DRESSER, OF BRADFORD, PENNSYLVANIA, ASSIGNOR TO S. R. DRESSER MANUFACTURING COMPANY, OF BRADFORD, PENNSYLVANIA.

PIPE-COUPLING.

No. 884,371.

Specification of Letters Patent.

Patented April 14, 1908.

Application filed July 9, 1906. Serial No. 325,377.

*To all whom it may concern:*

Be it known that I, SOLOMON R. DRESSER, a citizen of the United States, residing at Bradford, in the county of McKean and State of Pennsylvania, have invented certain new and useful Improvements in Pipe-Couplings; and I do hereby declare the following to be a full, clear, and exact description of the invention, such as will enable others skilled in the art to which it appertains to make and use the same.

My invention consists in the novel features hereinafter described reference being had to the accompanying drawings which illustrate one form in which I have contemplated embodying my invention, and said invention is fully disclosed in the following description and claims.

Referring to the said drawings, Figure 1 is a perspective view of a coupling embodying my invention, showing it applied to the meeting ends of two pipe sections. Fig. 2 is a longitudinal sectional view of the same. Fig. 3 is a detail of my improved middle ring. Fig. 4 is an enlarged detail sectional view showing the packing ring, and adjacent parts. Fig. 5 is a plan view of one of the clamping rings. Fig. 6 is a detail perspective view of one of the rubber packing rings. Fig. 7 is an end view of the middle ring or sleeve, showing a slightly modified form of centering stop.

This invention relates to the type of pipe coupling generally denominated "rubber packed pipe couplings" which comprise a "middle ring" or sleeve, two clamping rings, or flanges, two rubber packing rings fitting in recesses in the clamping rings or flanges, and engaging the ends of the middle ring, and bolts connecting the clamping rings or flanges. In the manufacture of this class of devices the middle ring is generally made of cast iron, and is used to bridge over the abutting ends of the pipe sections. It is a well known fact that in making any castings, certain defects, generally termed "sand holes" occur with considerable frequency, so that a casting is frequently pervious at one or more points and this occurs therefore in the manufacture of the cast iron middle rings. These minute apertures are seldom visible on an inspection of the casting, and it would, therefore, follow that if laid in the ground many of these middle rings would permit a considerable leakage of the gas or other fluid carried by the pipe line with which they are used. This would necessitate the uncovering and removal of the defective middle rings, and occasion a large expense and annoyance to the owners of the pipe lines. As a manufacturer of many thousands of these middle rings, I have for some years successfully endevored to avoid this difficulty, by testing each and every middle ring manufactured, under either hydraulic or pneumatic pressure or both, and discarding all rings which under the high pressures used in testing the same, developed sand holes or other defects, which would cause a leakage in use. The discarded rings are of course useless except as scrap iron, and a considerable loss to me as the manufacturer resulted, and further, testing apparatus suitable for testing rings of all the various sizes manufactured, had to be purchased and maintained and a regularly employed corps of workmen was required for the purpose of testing the rings and discarding those which were defective. This testing operation, therefore, adds considerably to the cost of manufacture of these rings, in addition to the loss from defective and discarded rings before noted.

My present invention has for one of its objects to produce a coupling in which the middle ring, as manufactured, is impervious, so that no preliminary testing of the rings is required, thus eliminating the two items of expense above noted, to wit, the expense of testing the rings before use, and the loss from imperfect castings. To this end I make the middle ring of wrought metal, instead of cast metal, using steel or wrought iron, but preferably steel, which is impervious and my invention also contemplates certain novel features of construction and combination of parts, hereinafter fully described.

Referring to Figs. 1, 2, 3 and 6 of the accompanying drawings, A represents the middle ring of my improved coupling which is made of wrought metal, preferably steel. By the term "wrought metal" I means a ductile metal such as is obtained from the ingot or bloom by rolling or otherwise, as distinguished from metal which is cast in a mold and cooled.

The middle ring A has its main body of cylindrical form, but at each end is flared outwardly at an angle to the axis of the ring to form a lip $a$, the outer edge or face $a'$ of which is perpendicular to the axis of the ring as shown. On its interior the ring A is provided with a centering stop, against which the meeting ends of the pipe sections may abut to center the ring over the joint, and consisting of an annular inwardly extending flange or rib $a^2$. The ring A may be formed by any desired method of manufacture which will produce an impervious ring, of wrought metal, and my invention further contemplates that the said ring shall be made in such a manner, that the grain or longitudinal arrangement of particles shall be in a direction around the ring, instead of extending parallel with the axis of the ring. This result may be accomplished in several ways, for example, the ring may be made from a flat rolled piece of steel or wrought iron of a length substantially equal to the periphery of the ring to be made therefrom, said bar being bent into the form of a ring and the ends welded, thus providing a ring in which the grain of the metal is in a direction around the walls of the ring. The ring can be given the desired form by turning or in any other desired manner. A ring formed in this manner has a much greater strength to resist internal and other strains and pressures, than a ring in which the grain of the metal runs parallel to its axis as in the latter case the rings frequently split apart and otherwise show weakness when exposed to severe strains.

B, B represent the clamping rings or flanges each of which consists of a flat annular plate $b$ provided at its inner edge with a projecting annular flange $b'$ forming a curved packing recess $b^2$ within the same, and surrounding the pipe section upon which the ring B is placed. The plate $b$ is provided at suitable intervals with bolt holes $b^5$ which are substantially oval in form, to receive similar shaped portions, formed on the connecting bolts, beneath the heads thereof. The outer periphery of the plate $b$, is also provided with a flange $b^3$ extending on the same side as the flange $b'$. This flange $b^3$ is increased in height (as at $b^4$) adjacent to the bolt holes $b^5$, and such portions $b^4$ are connected to the internal flange $b'$ by parallel, or radial webs $b^6$ $b^6$, arranged in pairs, the webs of each pair being located on opposite sides of a bolt hole. This form of flange is extremely light, and yet by arranging the webs on opposite sides of the bolt holes, and increasing the height of the flange $b^3$ where it joins these webs, great strength is obtained notwithstanding the lightness of the clamping ring.

C, C represent the packing rings of which two are employed in each coupling. These rings are made preferably of rubber, and are of peculiar form in cross section. Each ring has a rounded outer surface $c$ (substantially quadrantal) which engages the inner face of the packing recess in the clamping ring B. The outer part of the ring C is provided with a face or shoulder $c'$ which is perpendicular to the axis of the ring, and is of the same width as the perpendicular end face of the middle ring. The ring C also has an inclined face $c^2$ inclined to the axis of the ring, and extending from the base of shoulder $c'$ to the inner diameter of the ring, and serving to fit between the inclined inner face of the lip $a$ at the ends of the middle ring, and the outer face of the pipe section around which the packing ring is placed, as clearly shown in Fig. 2.

D, D are the clamping bolts which are passed through the oval shaped bolt holes in the clamping rings and provided with nuts $d$ $d$. Each bolt is what is termed a "track head" bolt, and is provided with an oval portion $d'$ below the head to pass into the oval bolt hole of the rings B, B, and prevent the bolts from turning while the nuts are turned up.

The assembling of the parts of this coupling will be clearly understood from an examination of Fig. 2. It is to be noted that the perpendicular end faces $a'$ at the ends of the middle ring engage the perpendicular shoulders of the packing ring squarely, and compress the body of the packing ring back into the packing recess, and crowd it between the curved wall of the recess, and the exterior of the pipe section E. The engagement of the inner face of the lip $a$ of the middle ring with the packing ring also tends to compress it between said lip and the pipe. The exterior of the lip $a$ is but slightly less in diameter than the packing recess in the clamping ring, as shown, and thus when the parts are drawn together, the packing ring is practically hermetically sealed within the clamping ring and the lip of the middle ring, and protected to a very large extent from disintegration when buried in the earth.

By using my improved impervious wrought metal middle ring, the danger of leakage from this source is entirely eliminated. Again the wrought metal ring is stronger and lighter than the cast iron ring, and the loss of time, material and labor required in testing the cast iron rings to insure efficiency, is entirely obviated.

I wish it to be understood that I do not limit myself to the use of an annular centering stop such as is shown in Fig. 2, as it is not necessary that this stop should be continuous, and in some instances I provide the interior of the middle ring with a stop comprising a series of separated lugs arranged in a plane transverse to the axis of the ring. In Fig. 7 (Sheet 1) I have illustrated such a construction in which A' represents the middle ring and $a^3$ $a^3$ represent a series of lugs arranged around the interior of the ring (preferably four in number) and forming the centering stop, the ring A' being in other respects exactly similar to the ring A previously described.

What I claim and desire to secure by Letters Patent is:—

1. In a pipe coupling, the combination with clamping rings and packing rings, of an impervious middle ring composed of wrought metal and having its ends constructed to engage said packing rings, and clamping devices connecting said clamping rings substantially as described.

2. In a pipe coupling, the combination with clamping rings, and packing rings, of an impervious middle ring, composed of wrought metal, having the grain extending around the ring, and having its ends constructed to engage the packing rings, and clamping devices connecting said clamping rings, substantially as described.

3. In a pipe coupling, the combination with clamping rings, and packing rings, of an impervious middle ring composed of wrought metal, having the grain extending around the ring, and having an interior projecting stop, and end portions constructed to engage the packing rings, and bolts for connecting said clamping rings, substantially as described.

4. In a pipe coupling, the combination with clamping rings provided each with a packing recess, and packing rings located therein, of an impervious middle ring composed of wrought metal, having an internal projecting centering stop, and end portions extending outwardly at an angle to the main body, forming lips, the end faces of said lips being perpendicular to the axis of the middle ring, and clamping bolts connecting said clamping rings, substantially as described.

5. In a pipe coupling, the combination with the clamping rings provided each with a packing recess, packing rings located in said packing recesses, each provided with a shoulder perpendicular to the axis of said packing ring, and an inclined portion extending from said shoulder to the inner diameter of the ring, of a middle ring having an inclined outwardly extending surface at each end to engage the inclined portions of said packing rings, and end portions perpendicular to the axis of said ring to engage the perpendicular shoulders of the packing rings, and bolts connecting said clamping rings, substantially as described.

6. A middle ring for a pipe coupling of the kind described, formed from a strip of wrought metal, bent into the form of a ring, and having its ends united by welding, said ring being provided internally with a centering stop and having outwardly extending annular portions at each end to engage packing rings, substantially as described.

In testimony whereof I affix my signature, in the presence of two witnesses.

SOLOMON R. DRESSER.

Witnesses:
J. H. GAYTON,
H. M. WICK.